United States Patent [19]

Mignen

[11] Patent Number: 4,484,804

[45] Date of Patent: Nov. 27, 1984

[54] MULTIFOCAL OPHTHALMIC LENSES

[75] Inventor: Bernard Mignen, St. Maur-des-Fossés, France

[73] Assignee: Essilor International Cie Generale d'Optique, Creteil, France

[21] Appl. No.: 279,185

[22] Filed: Jun. 30, 1981

[30] Foreign Application Priority Data

Jul. 9, 1980 [FR] France ................ 80 15246

[51] Int. Cl.³ .............................................. G02C 7/06
[52] U.S. Cl. .................................... 351/168; 351/171
[58] Field of Search ................. 351/168, 169, 170–172

[56] References Cited

U.S. PATENT DOCUMENTS

| | | | |
|---|---|---|---|
| 2,405,989 | 8/1946 | Beach | 351/169 |
| 3,010,366 | 11/1961 | Crawford | 351/169 |
| 4,274,717 | 6/1981 | Davenport | 351/169 |

FOREIGN PATENT DOCUMENTS

| | | | |
|---|---|---|---|
| 972402 | 3/1941 | France. | |
| 1217892 | 12/1959 | France. | |
| 2393335 | 2/1979 | France | 351/169 |

Primary Examiner—John K. Corbin
Assistant Examiner—Scott J. Sugarman
Attorney, Agent, or Firm—Charles E. Brown

[57] ABSTRACT

Multifocal ophthalmic lenses are disclosed such as a bifocal lens in which the convex front surface includes an upper part for distant vision having a first spherical surface and a lower part for reading having a second spherical surface, the radius of the first spherical surface being greater than the radius of the second spherical surface. A zone of curvature continuity connects the first and second spherical surfaces along at least one meridian, e.g. a central meridian, of the ophthalmic lens, and the second spherical surface extends away from the zone of surface continuity into a surface of revolution which may be spherical or toroidal. Junctions between the surfaces are defined by ledgeless intersections which are lines of curvature discontinuity extending away from the zone of surface continuity. In case of trifocal lenses, a third crescent-shaped spherical surface, having a radius of length intermediate the radii of the first and second spherical surfaces, is interposed between the first and second spherical surfaces.

18 Claims, 6 Drawing Figures

MULTIFOCAL OPHTHALMIC LENSES

FIELD OF THE INVENTION

The present invention relates generally to multifocal ophthalmic lenses of the type commonly used for correcting farsightedness or presbyopia. The invention relates more particularly though not exclusively to bifocal ophthalmic lenses.

PRIOR ART

As is known, one of the faces of bifocal ophthalmic lenses, in practice the front face, comprises an upper part for distant vision having a first spherical surface with a radius R1 and a lower part for reading having a second spherical surface with a radius R2 less than radius R1.

From the standpoint of their construction there are two main types of bifocal ophthalmic lenses which may be identified. First of all, there are ophthalmic lenses having a connecting zone between its two spherical surfaces defined by an intersection or line of curvature discontinuity in which the intersection forms a closed contour within the contour of the ophthalmic lens, the second spherical surface for reading being entirely surrounded by the first spherical surface for distant vision, or in which the intersection extends from one point to another along the periphery of the lens, the second spherical surface for reading forming the entire lower part of the lens and the first spherical surface for distant vision forming the entire upper part of the lens.

Such an intersection or line of curvature discontinuity is unaesthetic because it produces a bull's eye effect.

It has thus been proposed to make such an intersection invisible by smoothing down the line of curvature discontinuity with a fillet between the adjoining spherical surfaces. Such a smoothed intersection, however, interferes with the wearer's vision. And since the smoother intersection extends along the entire boundary between the spherical surface, the wearer's gaze crosses the smoothed intersection each time the wearer's gaze shifts from distant vision to reading and vice versa to the detriment of the visual comfort of the wearer.

The second kind of bifocal ophthalmic lenses is that in which along at least one meridian thereof, typically the central meridian, there is no intersection or line of curvature discontinuity, the second spherical surface for reading being in continuity with the first spherical surface for distant vision. In other words these spherical surfaces have a common normal at their junction point along the central meridian.

But with lenses of this kind the connection between the two spherical surfaces to either side of the zone of curvature continuity cannot be defined by a mere intersection or line of curvature discontinuity. Instead, it is inevitably formed by a ledge or step whose width increases from the zone of curvature continuity to the periphery of the lens and is proportionally greater with increasing differences in curvature between the spherical surfaces. The ledge of such a bifocal lens, known as an executive lens, is generally too wide to be easily smoothed down without creating an unacceptably large zone of disturbance in the lens. The ledge thus remains visible. Moreover, such ledges are a source of manufacturing difficulties, particularly in the case of casting plastic or hard resin lenses.

OBJECTS AND SUMMARY OF THE INVENTION

According to the invention a particularly advantageous compromise is sought between the two kinds of bifocal lenses described briefly above, namely, those in which the connecting zone is defined by an invisible intersection or line of curvature discontinuity between the spherical surfaces and in which the connecting zone is defined by a visible ledge.

Another object is a multifocal lens which is not limited to bifocal lenses but includes other multifocal lenses such as trifocal lenses.

According to the invention there is provided a multifocal ophthalmic lens comprising an upper part for distant vision having a first spherical surface with a radius R1 and lower part for reading having a second spherical surface with a radius R2 less than R1. The ophthalmic lens according to the invention is characterized by a zone of curvature continuity lying along at least one meridian, typically the central meridian, of the ophthalmic lens and connecting the first and second spherical surfaces; the second spherical surface extends away from the zone of curvature continuity into a surface of revolution; and junctions between the surfaces are defined by ledgeless intersections extending away from the zone of surface continuity.

In the case of bifocal ophthalmic lenses the second spherical surface is joined to the first spherical surface by the zone of surface continuity along the one meridian, the first and second spherical surfaces having a common tangent at their point of junction. In other words, in a bifocal lens embodying the invention the first and second spherical surfaces are in continuity with each other along at least the one meridian of the zone of continuity but without the ledges inherent in known executive lenses since the first and second spherical surfaces are joined to each other by ledgeless intersections beyond the zone of continuity which may define an invisible junction and is therefore aesthetically satisfactory.

Obviously, such a ledgeless intersection can be advantageously smoothed down, unlike the ledges of executive lenses. Furthermore, in this event, the resulting zone of disturbance does not affect the zone of curvature continuity along the one meridian between the first and second spherical surfaces so that along the zone of curvature continuity the shift of one's gaze between distant and reading vision or vice versa is undisturbed. The attendant visual comfort is therefore enhanced.

Thus, a bifocal ophthalmic lens embodying the invention advantageously combines good viewing comfort with satisfactory aesthetic qualities.

According to an embodiment of the invention adapted to trifocal lenses or other multifocal lenses having a greater number of surfaces of different refractive power, a third or more intermediate spherical surfaces are disposed between the first and second spherical surface having a radius or radii smaller than the radius of the first spherical surface and greater than the radius of the second spherical surface, the zone of curvature continuity extending along the one meridian across the intermediate spherical surface between the first and second spherical surfaces.

These and other features and advantages of the invention will now be brought out in the description which follows, given by way of example, with reference to the accompanying diagrammatic drawings.

DETAILED DESCRIPTION OF THE PREFERRED EMBODIMENTS

Figure 1:
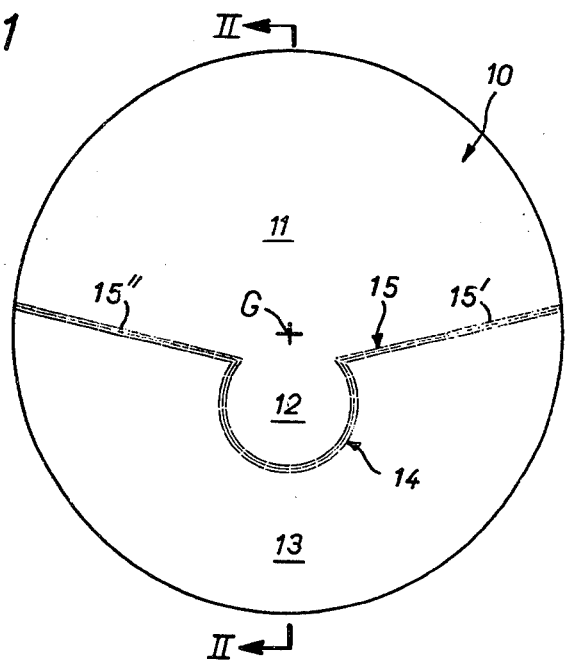
FIG. 1 is an elevational view of an ophthalmic lens embodying the invention.

The multifocal lenses according to the invention are illustrated in the drawings before edging, in other words, before the grinding of the peripheral edge of the lens to adapt it to the particular contour of the rims of eyeglasses in which they are to be mounted. The peripheral contours of the lenses before edging are generally circular. The convex front face 10 of the lens comprises an upper part having a first spherical surface 11 for distant vision with a radius R1 and a lower part having a second spherical surface 12 for reading with a radius R2 less than radius R1.

The embodiments of FIGS. 1–5 all relate to bifocal lenses. In the first spherical surface 11 itself defines the entire upper part of the ophthalmic lens and is associated with the second spherical surface 12 for reading in the lower part.

According to the invention, the convex front face 10 of the ophthalmic lens comprises a zone of curvature continuity running between the first and second spherical surfaces 11 and 12 along at least one meridian, preferably the so-called central meridian which coincides with the section line II—II through the lens in FIG. 1. The so-called central meridian need not, however, coincide with the actual center of the lens but may be slightly off to one side or even slightly skewed. In any event there is no curvature discontinuity in the zone of curvature continuity between the first and second spherical surfaces.

In addition, the second spherical surface 12 extends from the zone of curvature continuity into a surface of revolution, also known as a connecting surface, the second spherical surface 12 being substantially surrounded by the surface of revolution 13. The junctions between the first and second spherical surfaces and the surface of revolution are all defined by ledgeless intersections or lines of curvature discontinuity between their corresponding adjoining surfaces.

In the bifocal lenses illustrated in FIGS. 1–5, the ledgeless intersections or lines of curvature discontinuity are respectively between the first spherical surface 11 and the surface of revolution 13 and the second spherical surface and the surface of revolution 13. These intersections likewise define boundaries between the surface of revolution and the first and second spherical surfaces.

As there is a zone of curvature continuity running between the first and second spherical surfaces 11 and 12, the first and second spherical surfaces have a common tangent T at least along the one meridian, here the central meridian.

The surface of revolution 13 may also be a spherical surface as shown in the embodiments of FIGS. 1–4.

Preferably, the center C of the spherical surface of revolution 13 is disposed above the plane P perpendicular to the central meridian containing the centers A and B of the first and second spherical surfaces 11 and 12. The plane P is represented by a phantom line in FIG. 2 which is inclined downwardly relative to the geometrical axis G of the lens which is assumed to be horizontal in the upright position of the lens.

The ledgeless intersection 14 between surfaces 12 and 13 is in practice particular in a plane perpendicular to the line joining the centers B and C. Similarly, the ledgeless intersection 15 between surfaces 11 and 13 is part circular, lying in a plane perpendicular to the line joining the centers A and C. In practice, the intersection 15 is broken up into two segments 15' and 15" each of which runs from one end of the intersection 14 toward the periphery of the lens. In other words all the intersections 14, 15' and 15" extend or radiate from the zone of curvature continuity.

Figure 2:
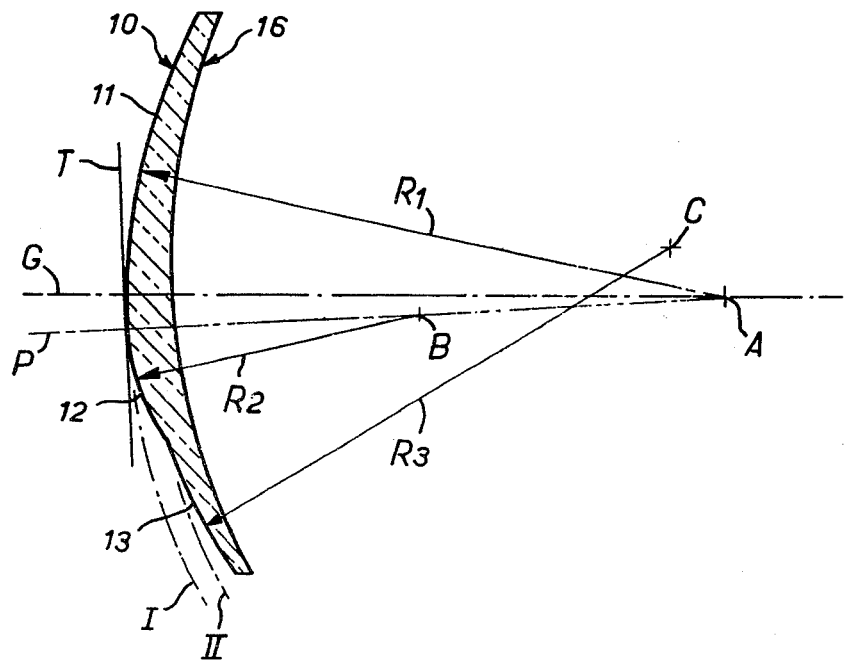
FIG. 2 is a longitudinal cross sectional view taken on line II—II in FIG. 1.

In the embodiment of FIGS. 1 and 2 the radius R3 of the surface of revolution 13 is smaller than the radius R1 of the first spherical surface 11 and greater than the radius R2 of the second spherical surface 12. In this case the intersections 15' and 15" slope upwardly from the free ends of the intersection 14.

Figure 3:
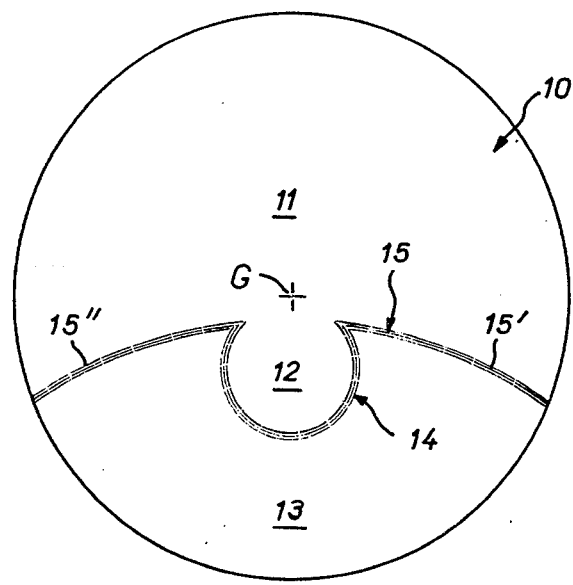
FIGS. 3 and 4 are views similar to those of FIGS. 1 and 2, respectively, for an other embodiment.
Figure 4:
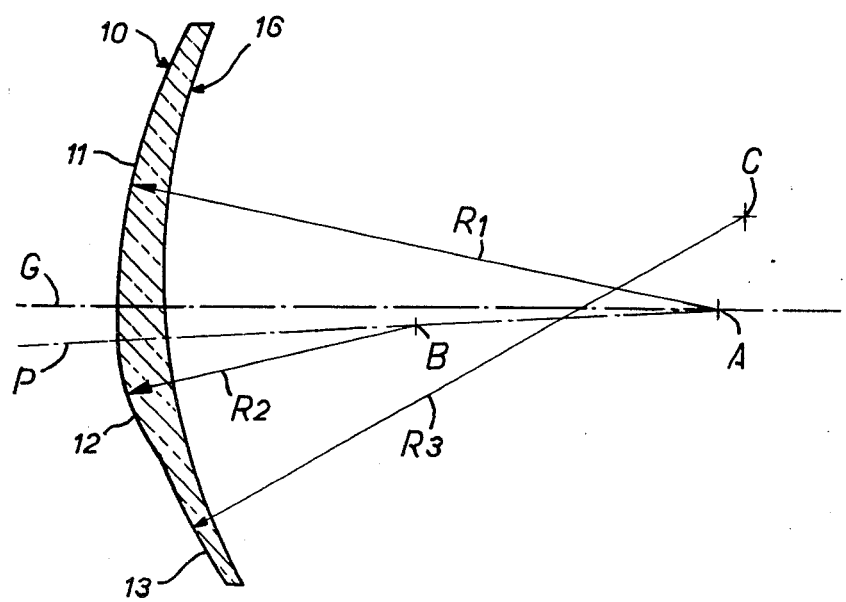

Alternatively, as shown in FIGS. 3 and 4, the radius R3 of the surface of revolution 13 is greater than the radius R1 of the first spherical surface 11. In this case the intersections 15' and 15" slope downwardly from the free ends of the intersection 14.

According to a nonillustrated embodiment, the radius R3 is equal to the radius R1 in which case the intersections 15' and 15" would radiate horizontally.

In any event, the intersection 14 is preferably smoothed down at least along part of its extent and preferably along its entire extent, a fillet connecting the adjoining surfaces. This is the reason the intersection 14 is represented by a plurality of parallel phantom lines since after the intersection is smoothed down it is invisible.

Likewise, the intersections 15' and 15" which in practice are smoothed down are also rendered invisible.

To better illustrate the features of the invention the continuation of the spherical surface 11 is represented by phantom line I in FIG. 2, and the phantom line II represents the configuration that the lower part of the lens would have had if the surface of revolution 13 were not shifted upwardly, i.e., if its center C were in the plane P containing the centers A and B of the spherical surfaces 11 and 12 instead of being disposed above this plane P. Intersections 15' and 15" would then have been more accentuated and therefore more difficult to smooth down.

The back face 16 of the lens which is concave may be spherical, toroidal or cylindrical in accordance with the desired prescription.

Figure 5:
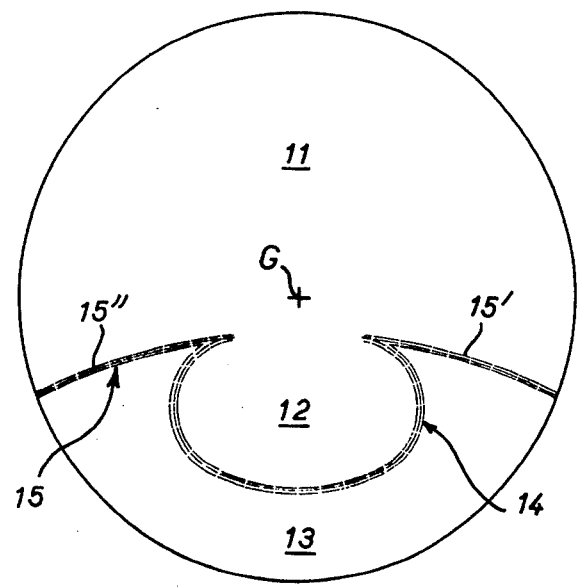
FIGS. 5 and 6 are views similar to those of FIGS. 1 and 2, respectively, for still another embodiment.

In the embodiments of FIGS. 1–4 the surface of revolution 13 is spherical too. Alternatively, as shown in FIG. 5, the surface of revolution 13 is toroidal which vertically lengthens or shortens and/or laterally enlarges the area of reading vision of the second spherical surface 12. The axis of revolution of the toroidal surface 13 may, for example, pass through the center of the spherical surface 12 or the center of spherical surface 11. Preferably, its radii of curvature—whether they are in the plane of the central meridian of the lens or whether they are in parallel planes perpendicular to the latter—are between the lengths of the radii R1 and R2 of the spherical surfaces 11 and 12.

Figure 6:
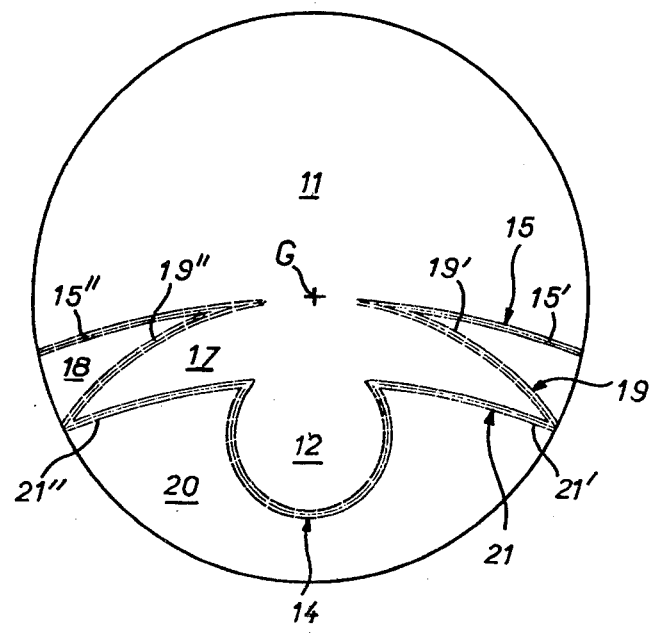

In the alternative embodiment illustrated in FIG. 6, a third or intermediate spherical surface 17 extends continuously between the first spherical surface 11 and the second spherical surface 12 thereby defining the zone of curvature continuity running between the first and second spherical surfaces. The radius of the third spherical surface 17 is intermediate that of radii R1 and R3 and thus forms a transitional surface corresponding to intermediate vision between distant vision and reading. The lens illustrated in FIG. 6 is therefore a trifocal lens. It will be understood that by inserting more than one intermediate spherical surface between the first and second spherical surfaces a larger number of separate refractive power zones may be provided between the first and second spherical surfaces, but in all case there remains an unbroken zone of curvature continuity between the first and second spherical surfaces.

In the illustrated embodiment of the trifocal lens in accordance with FIG. 6, the third or intermediate spherical surface 17 is of laterally extending crescent configuration running to either side of the central meridian of the lens.

The surface of revolution 20 defines the lower part of the lens into which the second spherical surface extends, and the tapered ends of the crescent-shaped spherical surface 17 extend between surfaces of revolution 18 and 20. Junctions between the first spherical surface 11 and the surface of revolution 18 are defined by ledgeless intersections 15' and 15''. The junction 19 between the surface of revolution 18 and the third or intermediate spherical surface 17 comprises two ledgeless intersections 19' and 19''. The junction 21 between the third spherical surface 17 and the surface of revolution comprises two ledgeless intersections 21' and 21''. And finally the junction between the second spherical surface 12 and the surface of revolution 20 is again formed by the ledgeless intersection 14. Each of the intersections 14, 15', 15'', 19', 19'', 21' and 21'' comprises a junction line of surface discontinuity.

As above, the surfaces of revolution 18 and 20 are, for example, spherical or toroidal.

According to a preferred embodiment the surfaces of revolution 18 and 20 are both spherical and their radii are respectively equal to those of the first and third spherical surfaces 11 and 17.

Obviously the invention is not limited to the several illustrated and described embodiments but rather encompasses modifications and alternatives understood to those skilled in the art without departing from the scope of the appended claims.

In particular, the second spherical surface 12 for reading is shown in the various embodiments as being in vertical alignment with the first spherical surface for distant vision. On the contrary, the second spherical surface may be slightly offset from the first spherical surface in which case the so-called central meridian will be at an angle relative to the vertical. Such an arrangement takes into account the known natural slanting movement of the wearer's gaze when shifting from distant vision to reading or vice versa.

What I claim is:

1. A bifocal opthalmic lens of a kind having a convex front surface which includes an upper part for distant vision having a first spherical surface and a lower part for reading having a second spherical surface, each of said first and second spherical surfaces each having a radius, the radius of said first spherical surface being greater than the radius of said second spherical surface, said first and second spherical surfaces having a junction and a common tangent at said junction along at least one meridian, said second spherical surface extending away from said junction of said first and second spherical surfaces into a surface of revolution, and junctions between said surface of revolution and said first and second spherical surfaces defined by ledgeless intersections.

2. An ophthalmic lens according to claim 1, wherein said ledgeless intersections define lines of curvature discontinuity.

3. An ophthalmic lens according to claim 1, wherein said at least one meridian is a central meridian.

4. An ophthalmic lens according to claim 1, wherein said surface of revolution is a spherical surface.

5. An ophthalmic lens according to claim 3, wherein said surface of revolution is a spherical surface.

6. An ophthalmic lens according to claim 5, with centers of said first and second spherical surfaces having centers lying in a plane perpendicular to a plane containing said central meridian, wherein said center of said spherical surface defined by said surface of revolution is disposed above said first-mentioned plane.

7. An ophthalmic lens according to claim 1, wherein said surface of revolution is toroidal.

8. An ophthalmic lens according to claim 1, wherein said ledgeless intersections are fillets connecting corresponding adjoining surfaces.

9. An ophthalmic lens according to claim 8, wherein said surface of revolution is toroidal.

10. A multifocal ophthalmic lens of the kind having a convex front surface which includes an upper part for distant vision having a first spherical surface and a lower part for reading having a second spherical surface, and an intermediate part for intermediate vision having a third spherical surface interposed between said first and second spherical surfaces, said first, second and third spherical surfaces each having a radius, the radius of said first spherical surface being greater than the radius of said second spherical surface, and the radius of the third spherical surface being intermediate those of said first and second spherical surfaces, adjoining ones of said spherical surfaces having junctions and common tangents at each of said junctions along at least one meridian, said second and third spherical surfaces each extending into surfaces of revolutions, and junctions between said first, second and third spherical surfaces and adjoining ones of said surfaces of revolution being defined by ledgeless intersections.

11. An ophthalmic lens according to claim 10, wherein said ledgeless intersections define lines of curvature discontinuity.

12. An ophthalmic lens according to claim 10, wherein said at least one meridians include a central meridian.

13. An ophthalmic lens according to claim 10, wherein each surface of revolution is a spherical surface.

14. An ophthalmic lens according to claim 10, wherein each surface of revolution is toroidal.

15. An ophthalmic lens according to claim 10, wherein said ledgeless intersections are fillets connecting corresponding adjoining surfaces.

16. An ophthalmic lens according to claim 10, wherein said third spherical surface is of a laterally disposed crescent shape.

17. An ophthalmic lens according to claim 10, wherein at least one of said surfaces of revolution is spherical.

18. An ophthalmic lens according to claim 10, wherein at least one of said surfaces of revolution is toroidal.

* * * * *